United States Patent [19]
von Kaler et al.

[11] Patent Number: 4,987,796
[45] Date of Patent: Jan. 29, 1991

[54] INTERNAL RESERVOIR-DEFINING BODY FOR PERMITTING OIL EXPANSION WITHIN A HYDROSTATIC TRANSMISSION HOUSING

[75] Inventors: Roland L. von Kaler, Tecumseh, Mich.; William A. Gremminger, Aston, Pa.

[73] Assignee: Tecumseh Products Company, Tecumseh, Mich.

[21] Appl. No.: 364,897

[22] Filed: Jun. 12, 1989

[51] Int. Cl.⁵ .................. F16H 57/02; F16D 31/02
[52] U.S. Cl. .................................... 74/606 R; 60/478
[58] Field of Search ............... 74/606 R; 91/533; 60/478

[56] References Cited

U.S. PATENT DOCUMENTS

| | | |
|---|---|---|
| 1,178,111 | 4/1916 | Sundh . |
| 3,003,659 | 10/1961 | Miller .................. 22/85 C |
| 3,224,198 | 12/1965 | Schimkat ................ 60/53 |
| 3,534,551 | 10/1970 | Levrini ................. 6/52 C |
| 3,680,312 | 8/1972 | Forster ................. 60/53 |
| 4,377,966 | 3/1983 | Parker et al. ........... 91/533 |
| 4,516,474 | 5/1985 | Ochiai ................. 91/533 |
| 4,686,868 | 8/1987 | Heidrich ............. 74/606 R |
| 4,759,260 | 7/1988 | Lew ................... 91/533 |

Primary Examiner—Vinh T. Luong
Attorney, Agent, or Firm—Jeffers, Hoffman & Niewyk

[57] ABSTRACT

In a hydrostatic transmission, an oil expansion reservoir is formed as an integral part of the hydrostatic transmission housing, providing an extension to the housing chamber which encloses motion transmitting components of the transmission. The reservoir is defined by a yieldably compressible hollow body mounted within the chamber of the transmission housing. The hollow body is sealably attached at its open end to the outer wall of the transmission housing. The body includes a continuous cylindrical sidewall connected to a closed end wall and formed of alternating reversed annular folds which cause compression and expansion of the body sidewall to occur in a bellows-like fashion rectilinearly along a central longitudinal axis of the body.

16 Claims, 2 Drawing Sheets

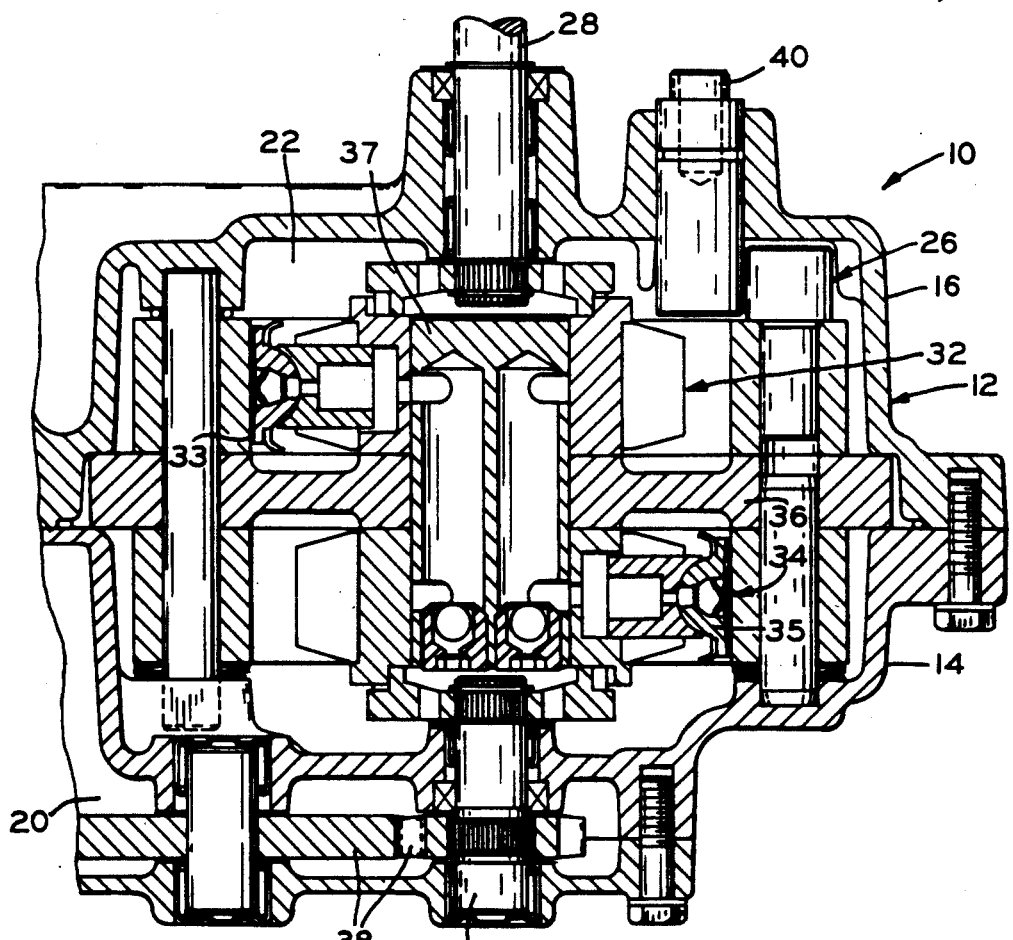
FIG_2
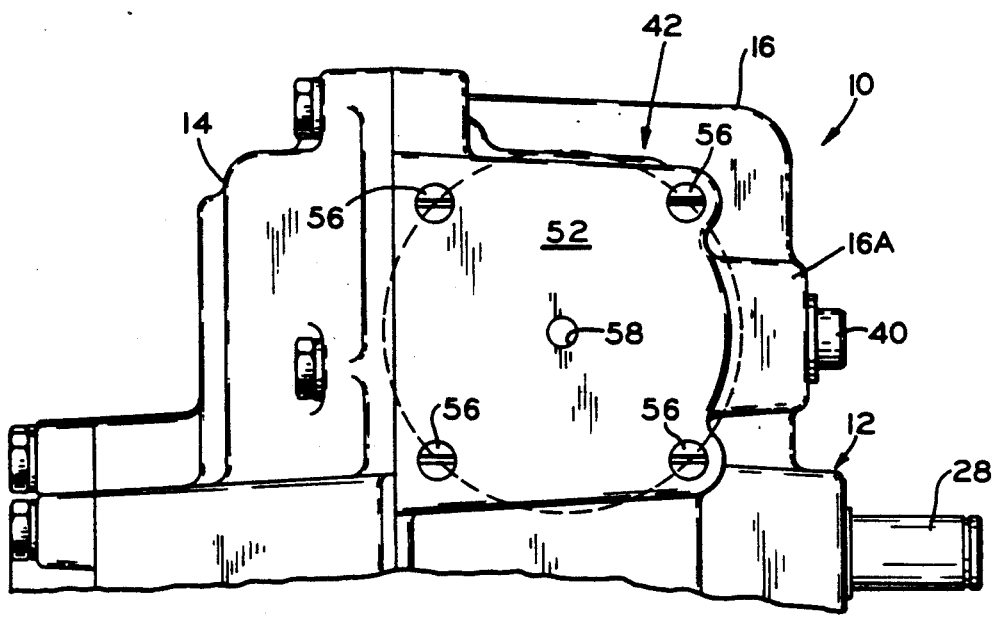
FIG_3

INTERNAL RESERVOIR-DEFINING BODY FOR PERMITTING OIL EXPANSION WITHIN A HYDROSTATIC TRANSMISSION HOUSING

BACKGROUND OF THE INVENTION

1. Field of the Invention

The present invention generally relates to hydrostatic transmissions and, more particularly, is concerned with a yieldably compressible hollow body for defining a reservoir for permitting oil expansion within a hydrostatic transmission housing.

2. Description of the Prior Art

Typically, motion transmitting components of a hydrostatic transmission are enclosed in a sealed chamber of the transmission housing which is completely filled with oil. The chamber needs to be full of oil to exclude air bubbles and prevent cavitation. However, during normal operation of the hydrostatic transmission, the oil increases in temperature. As the oil heats up, it expands in volume, for instance, as much as six to eight percent. Thus, a way has to be provided to accommodate the increased volume of oil and to ensure that the housing remains filled with oil.

One conventional practice has been to provide an expansion tank in communication with the housing chamber into which the excess volume of oil enters so that the chamber remains full of heated oil. Then as the oil cools and contracts in volume, the excess oil returns to the housing chamber to maintain it full.

An important drawback of this way of accommodating expansion in oil volume is that oftentimes the expansion tank is vented to ambient atmosphere. Venting of the expansion tank is a common practice so as to facilitate ease of flow of excess oil into the expansion tank and return flow thereof back to the transmission housing chamber unimpeded by any pressure conditions within the tank. However, venting of the expansion tank to atmosphere increases the likelihood of introduction of condensation into the tank and therefrom with the oil into the housing chamber.

The presence of moisture in the transmission chamber can have deleterious consequences. If heated sufficiently by the hot oil, the moisture can change into steam. Consequently, a need exists for an approach to accommodating oil expansion in hydrostatic transmissions which will overcome the above-described drawback of the conventional approach without introducing a new one.

SUMMARY OF THE INVENTION

The present invention provides an internal oil expansion reservoir in a hydrostatic transmission housing chamber otherwise filled with oil which is designed to satisfy the aforementioned need. In accordance with the principles of the present invention, an oil expansion reservoir is formed as an integral part of the hydrostatic transmission housing, providing an extension to the housing chamber. The reservoir is defined by a yieldably compressible hollow body mounted within the chamber of the transmission housing. The body is sealably attached at its open end to the outer wall of the transmission housing.

Normally, the yieldably compressible hollow body assumes an expanded condition wherein it encloses a void having a volume equal to the volume of reservoir space allotted within the housing for expansion of oil from the housing chamber. The exterior of the body is in contact with the oil filling the housing chamber, whereas the interior of the body is in communication with ambient atmosphere through a vent hole in the housing outer wall. In its expanded condition, the hollow body reduces the total volume of the housing chamber, whereas when collapsed to a compressed condition by expansion of oil the total volume of the housing chamber is increased.

More particularly, the hollow body is cup-shaped having an annular end flange at one end defining the open end of the body, an end wall at an opposite end defining a closed end of the body, and a continuous cylindrical sidewall extending between and connected to the end flange and opposite end wall and formed of alternating reversed annular folds which cause compression and expansion of the sidewall of the body to occur in a bellows-like fashion rectilinearly along a central longitudinal axis of the body.

The end flange on the hollow body is sealably attached to the outer wall of the transmission housing by an external cover plate. Attachment of the cover plate across an opening in the outer wall of the housing compresses the end flange of the body between the periphery of the cover plate and the edge of the housing outer wall defining the opening. The vent hole is formed through the cover plate.

Although air from ambient atmosphere can flow into and from the interior of the hollow body, the interior of the housing chamber filled with oil is sealed from the interior of the hollow body by the above-described manner of attachment of the body to the outer wall. Thus, the housing chamber and oil therein are sealed from any condensation which might deposit within the interior of the hollow body.

Unlike in the conventional approach, there is no contact between atmospheric air and oil that has expanded into the space or "reservoir" occupied by the compressible body. Further, a hallmark of the approach of the present invention lies in its simplicity. The yieldably collapsible hollow body is a simple one-piece unit whose material and configuration simulate and combine the functions of a spring and reservoir allowing it to achieve the desired objective of accommodating oil expansion. Thus, use of more complex and costly, multipart assemblies of pistons, seals, springs and/or diaphragms are avoided by the present invention.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged fragmentary vertical sectional view of the transaxle taken along line 2—2 of FIG. 1;

FIG. 3 is an enlarged fragmentary end elevational view of the transaxle as seen along line 3—3 of FIG. 1 but rotated ninety degrees clockwise from the orientation of the transaxle in FIG. 1.

DETAILED DESCRIPTION OF THE PREFERRED EMBODIMENT

Figures 1, 4:
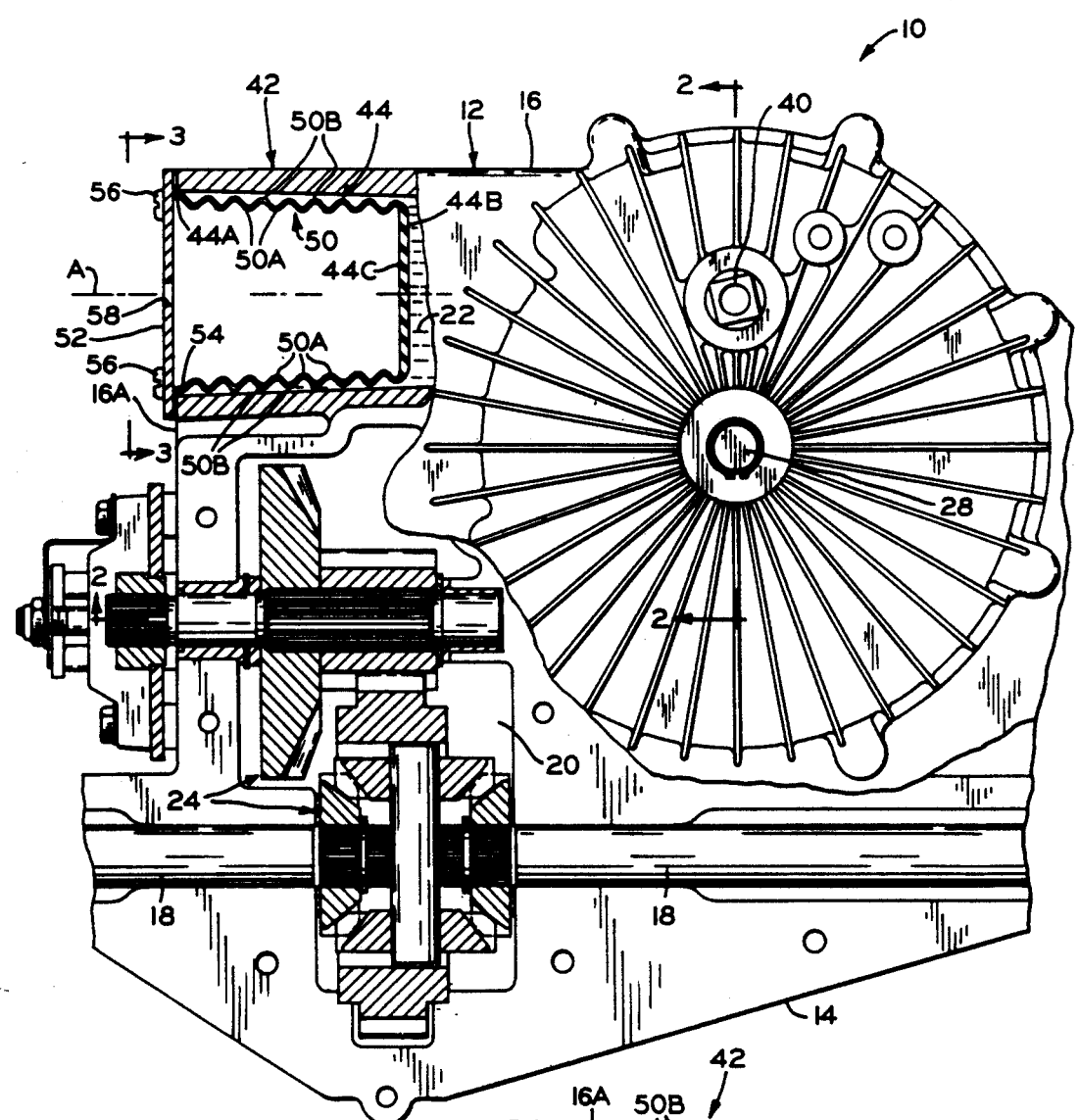
FIG. 1 is a top plan view, with portions broken away, of a variable speed transaxle, illustrating an oil expansion reservoir defined by a yieldably compressible hollow body being shown in an expanded condition within a hydrostatic transmission housing of the transaxle for permitting oil expansion in accordance with the principles of the present invention.
FIG. 4 is a plan view of a fragmentary portion of the housing of FIG. 1, illustrating the compressible reservoir-defining body in a compressed condition.

Referring now to the drawings, and particularly to FIGS. 1 and 2, there is shown a variable speed transaxle, generally designated by the numeral 10. The construction of the transaxle 10 will only be briefly described herein to give an overview of one apparatus which has a need for a device to accommodate for oil expansion and in which the principles of the present invention can be advantageously employed.

The transaxle 10 includes an axle housing 12 composed of lower and upper axle housings 14, 16 which abut and are fastened together to rotatably support axle shafts 18. The axle housings 14, 16 when abutted and fastened together define separate internal gear and transmission chambers 20, 22 which respectively house a bevel gear and differential assembly 24 drivingly coupled to the axle shaft 18, and a hydrostatic transmission 26 drivingly coupled between input and output drive shafts 28, 30 rotatably mounted respectively to the upper and lower axle housings 16, 14.

More particularly, mounted in the transmission chamber 22, the hydrostatic transmission 26 includes an upper pump 32 and a lower motor 34 located at opposite upper and lower sides of a central sandwich plate 36. The hydrostatic transmission chamber 22 housing the pump 32 and motor 34 is also completely full of oil to ensure their proper operation. The pump 32 comprises a plurality of radial pistons 33 and is driven by the input drive shaft 28 which, in turn, mounts a drive pulley (not shown) driven from the engine of the vehicle using the transaxle 10. The motor 34 comprises a plurality of radial pistons 35 and is operated by the pressurized oil from pump 32 in a known manner. Motor 34 drives the output drive shaft 30. Motor 34 and pump 36 are supported on pintle 37. The output shaft 30 is drivingly connected to the bevel gear and differential assembly 24 via a train of spur gears 38. A variable speed control shaft 40 mounted to the upper axle housing 16 is connected to the pump 32 and turned by action of the vehicle operator to adjust the transmission ratio. Further details of hydrostatic transmissions are disclosed in U.S. Pat. No. 4,691,512, which is incorporated herein by reference.

Also shown in FIG. 1 is an oil expansion reservoir 42 formed as an integral part of the upper axle housing 16 in accordance with the principles of the present invention. The oil expansion reservoir 42 provides an extension to the transmission chamber 22 for oil expansion. The reservoir 42 is defined by a yieldably compressible hollow body 44 mounted within the transmission housing chamber 22. The body 44 is sealably attached at its open end 44A to an outer wall 16A of the upper axle housing 16.

More particularly, the yieldably compressible hollow body 44 is cup-shaped overall and has an annular end flange 46 at one end defining the open end 44A of the body, an end wall 48 at an opposite end defining a closed end of the body, and a continuous cylindrical sidewall 50. The sidewall 50 extends between and is connected to the end flange 46 and the opposite end wall 48. The sidewall 50 if formed of alternating reversed annular folds 50A, 50B which close and open in bellows-like fashion, guiding compression and expansion of the hollow body 44 rectilinearly along a central longitudinal axis A thereof.

Referring to FIG. 3, the end flange 46 on the hollow reservoir-defining body is sealably attached to the outer wall 16A of the transmission chamber housing 16 by an externally-attached circular cover plate 52. Attachment of the cover plate 52 across a circular opening 54 in the outer wall 16A of the housing 16 by screws 56 compresses the end flange 46 of the hollow body 44 between the periphery of the cover plate 52 and the edge of the housing outer wall 16A defining the opening 54.

A central vent hole 58 is formed through the cover plate 52. Although air from ambient atmosphere can flow into and from the interior of the hollow body 44 via the vent hole 58, the interior of the transmission chamber 22 filled with oil is sealed from the interior of the hollow body 44 by the above-described manner of sealed attachment of the body 44 to the outer wall 16A. Thus, the chamber 22 and oil therein are sealed from any condensation which might deposit within the interior of the hollow body 44.

Normally, the yieldably compressible hollow body 44, due to the resilient spring-like nature of its material, is biased toward and assumes an expanded condition, as seen in FIG. 1. In the expanded condition, the hollow body 44 encloses a void having a volume equal to the volume of reservoir space allotted within the housing 16 for expansion of oil from the transmission chamber 22. The exterior surface 44B of the body 44 is in contact with the oil filling the transmission chamber 22, whereas the interior 44C of the body 44, as explained above, is in communication with ambient atmosphere through the vent hole 56 in the housing outer wall 16A and sealed from the chamber 22.

It is readily apparent that in its expanded condition, the hollow body 44 reduces the total volume of the transmission chamber 22 just enough so that the chamber is full of oil. On the other hand, when the hollow body 44 is collapsed to a compressed condition, such as shown in FIG. 4, by expansion of oil in the chamber 22 the total volume of the chamber 22 is increased and remains full of oil, the collapsed body 44 freeing up the necessary extra space to accommodate the expanded volume of oil.

Therefore, during normal operation of the hydrostatic transmission 26, the hollow body 44 compresses and reduces in volume in responsive to increasing pressure on its exterior surface 44B imposed by expansion of oil due to increasing temperature. The volume of the void enclosed by the body 44 is proportionately decreased and the space within the housing 16 which can be occupied by the oil is correspondingly increased. Later, when the oil within the chamber 22 cools and contracts in volume, the hollow body 44 due to the resilient spring-like nature of its material automatically returns to its original expanded condition from its compressed condition, maintaining the volume of the chamber 22 full of oil. The material forming the body 44 can be any suitable rubber or plastic material, one example being a synthetic rubber marketed under the tradename, ALCRYN. The spring-like resiliency of the hollow body 44 which biases it to the expanded condition also keeps pressure on the oil in the chamber 22 which, in turn, maintains pressure on check valves (not shown) in the transmission.

In conclusion, the reservoir-defining hollow body 44 is highly advantageous over other approaches for providing an oil expansion reservoir. First, there is no sliding seal subject to leaking as would be the case in the use of a piston sliding in a cylinder. Second, by providing an internal oil expansion reservoir with the body 44, the space for the reservoir is incorporated internally into the casting for the transaxle 10. Therefore, the necessity for sealing and bolting an auxiliary housing onto the main transaxle housing which would be a further source of potential leaks and additional cost in assembly is eliminated. Third, the end flange 46 of the hollow body 44, being made of a synthetic rubber material, serves as the gasket for the cover plate 52. Finally, as has been mentioned earlier, the inherent resiliency of the material of the body 44 causes it to expand and push oil back into the chamber 22 in order to keep the transmission 26 fully charged with fluid.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A hydrostatic transmission having a housing defining a chamber containing transmission fluid, a pump in said chamber, input shaft means extending through said housing for driving said pump, a motor in said chamber fluidly connected to said pump and driven by said pump, output shaft means connected to said motor and extending out of said housing for transmitting mechanical motion of said motor, and a fluid expansion reservoir, comprising:
   - a yieldably compressible hollow body of resilient, spring-like material, said hollow body mounted within said chamber of said housing and being sealably attached at an open end of said hollow body to said housing;
   - said hollow body having an exterior surface in contact with said fluid in said housing chamber and an interior surface in communication with ambient atmosphere at the exterior of said housing;
   - said hollow body including means for biasing said hollow body to an expanded condition in which said hollow body decreases the effective volume of said chamber to maintain said chamber substantially full of said fluid, said hollow body being compressible, by increase in pressure on said exterior surface from expansion of said fluid in said chamber, from said expanded condition to a compressed condition in which said hollow body increases the effective volume of said chamber and thereby accommodates expansion of said fluid in said chamber.

2. The transmission as recited in claim 1, wherein said hollow body in said expanded condition defines a first void within said chamber having a predetermined volume substantially equal to the volume of reservoir space allotted within said housing for expansion of said fluid, and said body in said compressed condition defines a second void within said chamber having a volume less than said predetermined volume of said first void.

3. The transmission as recited in claim 1, wherein said hollow body automatically returns to said expanded condition from said compressed condition upon contraction of said fluid in said chamber.

4. The transmission as recited in claim 1, wherein said hollow body has a continuous cylindrical sidewall formed of alternating reversed annular folds which respectively close and open in a bellows-like fashion upon compression and expansion of said hollow body.

5. The transmission as recited in claim 4, wherein said hollow body has an end wall connected to said sidewall, said end wall defining a closed end of said hollow body in contact with said fluid in said chamber.

6. The transmission as recited in claim 1, wherein said hollow body is cup-shaped having an annular end flange at one end, said end flange defining said open end of said hollow body.

7. The transmission as recited in claim 6, wherein said end flange is sealably attached to said housing.

8. The transmission as recited in claim 7, wherein said housing has an edge portion defining an opening; and further including an external cover plate attached across said housing opening to said housing edge portion so as to seal said end flange of said hollow body between a periphery of said cover plate and said housing edge portion.

9. The transmission as recited in claim 8, wherein said cover plate has a vent hole formed therethrough permitting air from ambient atmosphere to flow into and from the interior of said hollow body.

10. The transmission as recited in claim 6, wherein said hollow body has a continuous cylindrical sidewall formed of alternating reversed annular folds which respectively close and open in a bellows-like fashion upon compression and expansion of said hollow body.

11. The transmission as recited in claim 10, wherein said hollow body has an end wall connected to said sidewall, said end wall defining a closed end of said hollow body in contact with said fluid in said chamber.

12. A hydrostatic transmission having a housing defining a chamber containing transmission fluid, a pump in said chamber, input shaft means extending through said housing for driving said pump, a motor in said chamber fluidly connected to said pump and driven by said pump, output shaft means connected to said motor and extending out of said housing for transmitting mechanical motion of said motor, and a fluid expansion reservoir, comprising:
   - an edge portion on said housing defining an opening;
   - a yieldably compressible hollow cup-shaped body of a resilient spring-like material, said hollow body disposed within said chamber of said housing and having an open end surrounded by an annular end flange and an exterior surface in contact with said fluid in said housing chamber; and
   - an external cover plate attached across said housing opening to said housing edge portion so as to seal said end flange of said hollow body between a periphery of said cover plate and said housing edge portion, said cover plate having a vent hole formed therethrough permitting air from ambient atmosphere to flow into and from the interior of said hollow body;
   - said hollow body being formed of a material biasing said hollow body to an expanded condition in which said hollow body decreases the effective volume of said chamber to maintain said chamber substantially full of said fluid, said hollow body being compressible, by increase in pressure on said exterior surface from expansion of said fluid in said chamber, from said expanded condition to a compressed condition in which said hollow body increases the effective volume of said chamber and thereby accommodates expansion of said fluid in said chamber.

13. The transmission as recited in claim 12, wherein said hollow body in said expanded condition defines a first void within said chamber having a predetermined volume substantially equal to the volume of reservoir space allotted within the housing for expansion of said fluid, and said hollow body in said compressed condition defines a second void within said chamber having a volume less than said predetermined volume of said first void.

14. The transmission as recited in claim 12, wherein said material of said hollow body has a resilient spring-like nature for automatically causing said body to return to said expanded condition from said compressed condition upon contraction of said fluid in said chamber.

15. The transmission as recited in claim 12, wherein said hollow body has a continuous cylindrical sidewall formed of alternating reversed annular folds which respectively close and open in a bellows-like fashion upon compression and expansion of said hollow body.

16. The transmission as recited in claim 15, wherein said hollow body has an end wall connected to said sidewall, said end wall defining a closed end of said hollow body in contact with said fluid in said chamber.

* * * * *